United States Patent

[11] 3,574,331

| [72] | Inventors | Keiji Kurosawa<br>Kamakura;<br>Makio Nakashio, Yokohama, Japan |
|---|---|---|
| [21] | Appl. No. | 841,792 |
| [22] | Filed | July 15, 1969 |
| [45] | Patented | Apr. 13, 1971 |
| [73] | Assignee | Mitsubishi Kakoki Kaisha Ltd<br>Tokyo, Japan |
| [32] | Priority | Dec. 18, 1968 |
| [33] | | Japan |
| [31] | | 43/92285 |

[54] AERATION TANK FOR WASTE TREATMENT
7 Claims, 10 Drawing Figs.

[52] U.S. Cl................................................... 210/195,
210/15, 210/219, 210/221, 261/93
[51] Int. Cl...................................................... C02c 1/12
[50] Field of Search........................................ 210/7, 14,
15, 220, 221, 194—197; 261/93, 124

[56] References Cited
UNITED STATES PATENTS

| 3,092,678 | 6/1963 | Braun............................ | 210/14X |
| 3,160,685 | 12/1964 | Chase............................ | 261/124 |
| 3,275,149 | 9/1966 | Ludwig et al. ................ | 210/7X |
| 3,444,076 | 5/1969 | Sekikawa et al. .............. | 210/7X |

*Primary Examiner*—Reuben Friedman
*Assistant Examiner*—Thomas G. Wyse
*Attorney*—Kelman and Berman ABSTRACT: The aeration tank in a plant for waste treatment by means of activated sludge is about 30 meters high and slender, and waste and oxygen-bearing gas are supplied to the bottom of the tank at the prevailing hydrostatic pressure of more than 40 p.s.i.g., thereby accelerating oxygen absorption by the mainly aqueous waste material and increasing the processing capacity of the tank over shallower tanks of equal volume.

PATENTED APR 13 1971

Keiji Kurosawa
Makio Nakashio

INVENTORS

*INVENTORS*

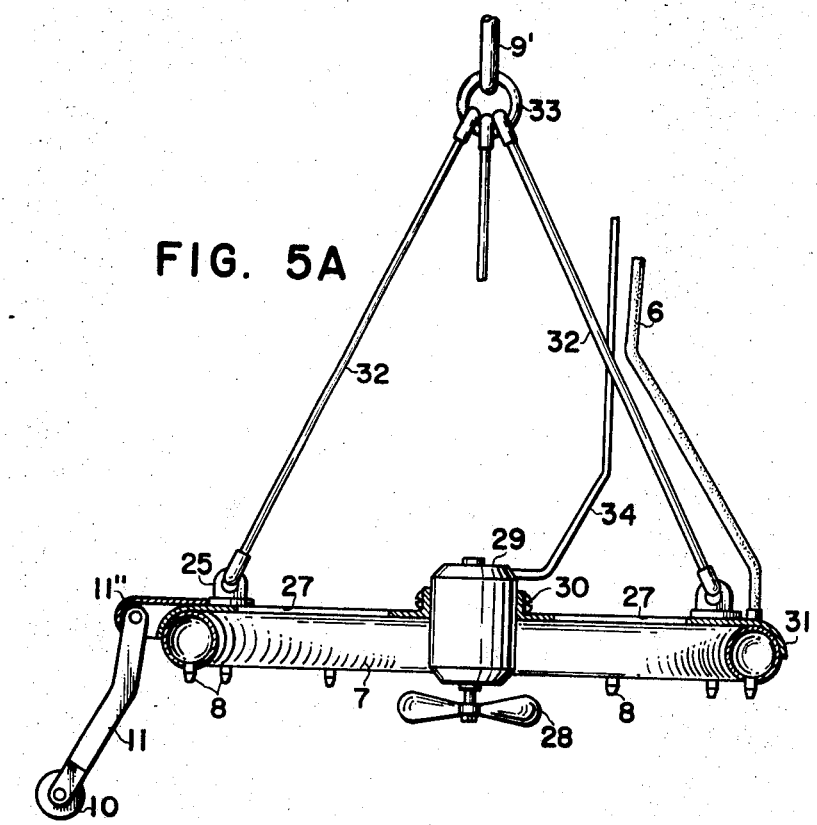
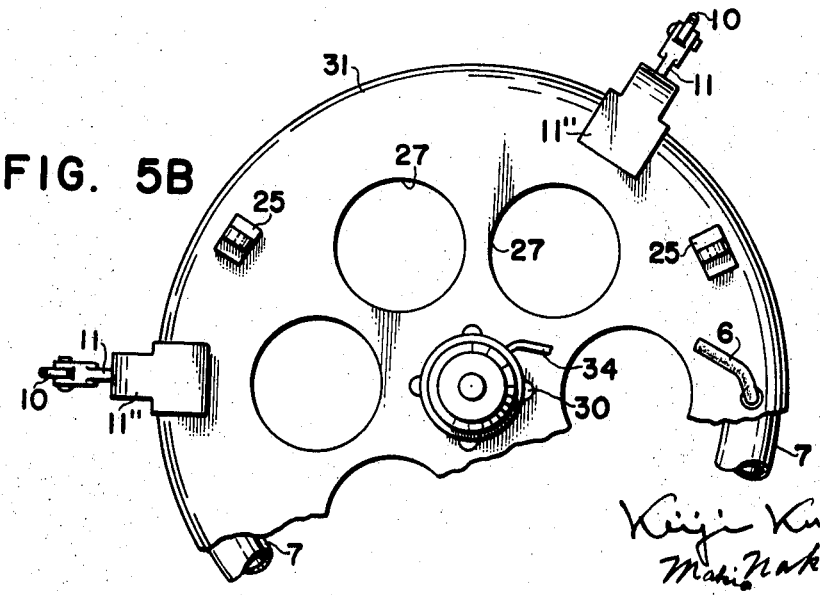

AERATION TANK FOR WASTE TREATMENT

BACKGROUND OF THE INVENTION

This invention relates to waste treatment by means of activated sludge, and particularly to an aerating tank and an aerating method for use in such waste treatment.

SUMMARY OF THE INVENTION

It has been found that the throughput of the aeration unit in such a waste treatment plant can be increased without increase in the supply of oxygen required for the growth and metabolism of the microorganisms which decompose the waste material, if the initial contact between gaseous oxygen and the waste material is made at hydrostatic pressures of not substantially less than 9 p.s.i.g., as is accomplished most conveniently in an open, vertically elongated aeration tank having an effective height or more than 6 meters between the supply level at which the oxygen-bearing gas normally enters the tank and the upper liquid level in the tank. Nozzles which discharge the gas into the partly liquid waste material in the tank can be lowered to the supply level and raised from that level above the upper liquid level in the aeration tank by a hoisting arrangement.

The aeration tank is connected by a conduit to a settling tank, as is conventional in this art, so that gas-treated waste material may be transferred from the aeration tank to the settling tank, and a recycling circuit permits settled solids to be returned from the settling tank to the aeration tank.

Other features, additional objects and many of the attendant advantages of this invention will readily become apparent from the following detailed description of preferred embodiments when considered in connection with the appended drawing.

BRIEF DESCRIPTION OF THE DRAWING

In the drawing:
FIG. 5A shows a modified nozzle assembly for use in the apparatus of FIG. 1, the view being in elevation on a scale greater than that of FIG. 1;
FIG. 5B is a fragmentary plan view of the device of FIG. 5A.

DESCRIPTION OF THE PREFERRED EMBODIMENTS

Figure 1:
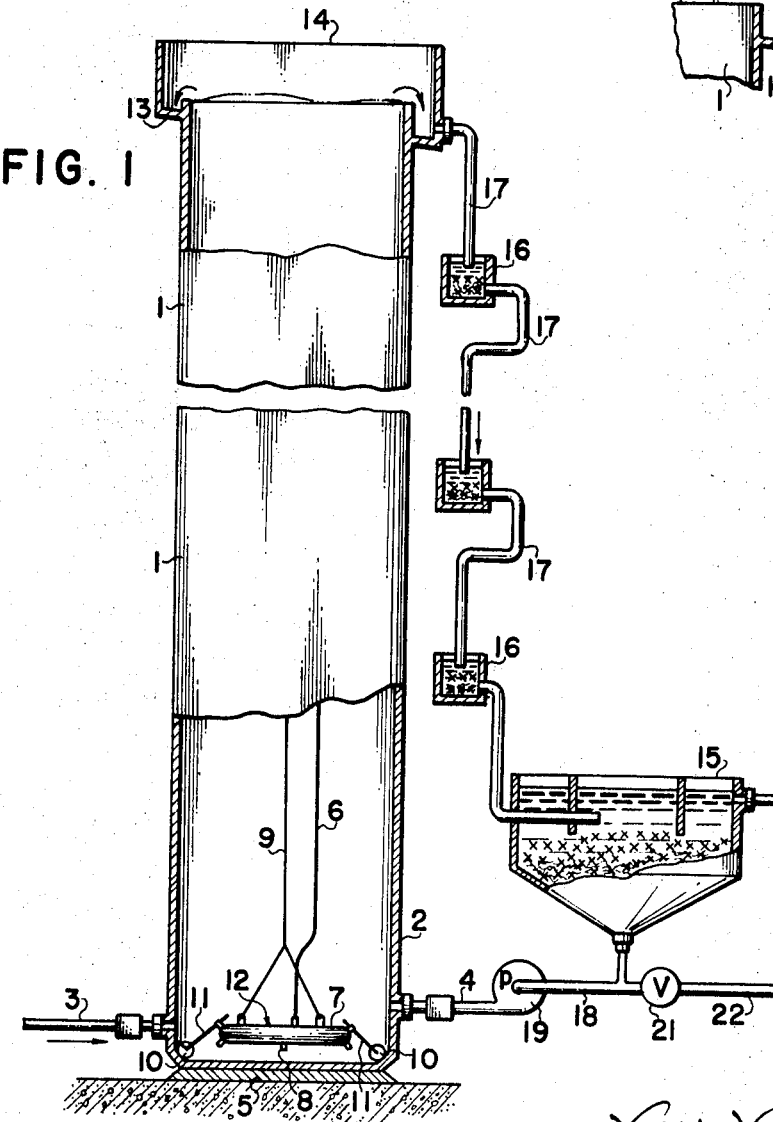
FIG. 1 shows a sludge-activating unit of the invention in fragmentary elevational section.

Referring now to the drawing in detail, and initially to FIGS. 1 and 3A to 3C, there is seen an aeration tank 1 having a height of 30 meters and a cross section of 4.7 meters square. An opening in an upright wall 2 near the bottom of the tank 1 is connected by a waste inlet conduit 3 with a waste pump, not itself illustrated. Another inlet conduit 4 enters the tank 1 on an only slightly higher level than the inlet 3. The bottom 5 of the tank 1 is substantially at ground level.

An air hose 6 which is connected to a nonillustrated compressor and enters the tank 1 through the open top of the same is connected to a toroidal manifold pipe 7 of a nozzle arrangement 12. A suspension cable 9, only partly seen in the drawing, is attached to the pipe 7 and passes upward through the open tank top to a nonillustrated winch. The axis of the pipe 7 is held vertical by the cable 9 while the nozzle assembly is being raised and lowered. The pipe 7 normally rests on the tank bottom 5 on wheels 10 at the end of legs 11 which extend obliquely downward from the pipe 7 when the nozzle arrangement 12 is in the operative position illustrated. Nozzles 8 are distributed over the circumference of the manifold 7 and discharge air toward the bottom 5.

As waste material is fed to the bottom of the tank 1, excess material overflows over the top edge of the tank into an annular trough 14 whose bottom 13 slopes toward an opening in the trough 14 closely adjacent the lowermost portion of the bottom 13. The opening is connected with a settling tank 15 on a lower level by a sequence of alternating, relatively narrow pipes 17 and upwardly open, relatively wide vessels 16.

The settling tank 15 has an upwardly open cylindrical top portion and a conically tapering bottom portion, and is provided with upright baffles in the top portion. It is connected with the aforementioned inlet 4 by a sludge return pipe 18 and a slurry pump 19. Its top is also equipped with a discharge duct 20 for supernatant liquid, and settled sludge may be released from its bottom through a control valve 21 and a conduit 22.

The aforedescribed apparatus is operated as follows:

A slurry of sewage or industrial waste, which may be pretreated in a known manner, is admitted to the tank 1 through the inlet 3. The slurry is saturated with oxygen and strongly agitated by the air discharged under pressure from the nozzles 8. Because of the height of the mainly liquid column in the tank 1, the hydrostatic pressure at the level of the nozzles 8 is approximately 40 to 45 p.s.i., and the gas dispersed in the continuous liquid phase is quickly stripped of its oxygen content by absorption in the waste material, the absorption rate being a function of the partial oxygen pressure at the gas/liquid interface, and thus of the hydrostatic pressure.

The undissolved nitrogen rises in bubbles through the column in the tower, attaching itself to solid sludge particles, and carrying the particles to the horizontal top edge of the tank 1 from which they are discharged, together with liquid, into the trough 14. There is a substantial increase in the average size of the sludge particles as they rise in the tank 1 and agglomerate, and the mixture of sludge and liquid is separated to a large extent in the settling tank 15 from which the liquid is drained through the discharge pipe 20, and the sludge is partly discharged through the duct 22 at a rate set at the valve 21, the remainder being returned to the bottom of the tank 1 through the return pipe 18, the slurry pump 19, and the inlet conduit 4.

Micro-organisms maintained in the tank 1 are cultured aerobically on the waste material. Because of the high concentration of available oxygen in the waste aerated at high pressure, the dwell time of the waste in the tank 1 which produces adequate activation of the sludge is substantially shorter than in conventional, relatively shallow aeration tanks in which the hydrostatic pressure at the aeration nozzles is not normally higher than 5 p.s.i.g. The culture in the tank 1 is maintained in a manner known in itself by the partial recycling of the activated sludge through the pump 19.

Significant improvements in the activation process over known methods have been found to require an aeration tank having an effective height of more than 6 meters, for a hydrostatic pressure of not significantly less than 9 p.s.i.g. at the tank bottom, and further improvements are achieved as the height of the tank is increased to the presently preferred value of 30 meters. The benefits of a further increase in height are balanced at this time by the cost of pumping waste material, air, and recycled sludge into the tank bottom at the higher pressures inherent in greater tank height. However, as better pumps and associated hardware become available, an increase in tank height to more than 30 meters may become more attractive, and tanks higher than 30 meters may be used successfully with currently available equipment.

Under otherwise equal conditions, higher tanks require less floor space and are desirable for this additional reason. Moreover, the uniformity of the material discharged from the tank is improved as the ratio of height to cross section is increased because of the higher rate of gas flow per unit of cross section under otherwise comparable conditions. For this reason, and because of the better utilization of the available oxygen by the micro-organisms in the tank, the amount of air needed may be reduced without loss in effectiveness if the height to cross section ratio is increased, other conditions, not in themselves relevant to this invention, being kept constant.

The settling tank 15 is normally arranged at ground level or on the roof of a low building such as the station of the operator for the activating unit. If the tall aeration tank 1 is installed entirely above ground, the difference in level between the overflow trough 14 and the settling tank 15 is such that a straight conduit of adequate cross section to prevent clogging would lead the overflowing slurry into the tank 15 at a velocity so high as to interfere with settling at a useful rate, and the relatively large sludge particles formed in the tank 1 would again be broken up.

The connecting conduit shown in FIG. 1 is therefore divided into alternating pipes 17 and vessels 16 connected in a manner to produce turbulence in the vessels 16 and to reduce or eliminate turbulence in the settling tank 15. To maintain a desired temperature in the aeration tank 1, heat exchangers are provided in the conduits 3 and/or 4 as needed, but have not been shown since they are conventional.

Figure 2:
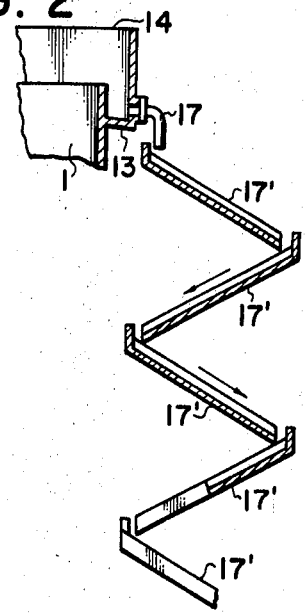
FIG. 2 shows a modified detail for use in the apparatus of FIG. 1.

An alternative connecting conduit for reducing the velocity of the material entering the settling tank 15 is illustrated in FIG. 2. It consists essentially of a row of obliquely downwardly sloping, open troughs 17' of which the uppermost is fed by a pipe section 17 from the trough 14, and the lowermost discharges its contents into the settling tank in a manner not specifically illustrated. The direction of flow is reversed as material is transferred from the lower end of each trough to the higher end of the next trough, the troughs 17' being arranged in an upright zigzag pattern, so that the overflowing liquid enters the settling tank at the desired low velocity.

Figure 3A:
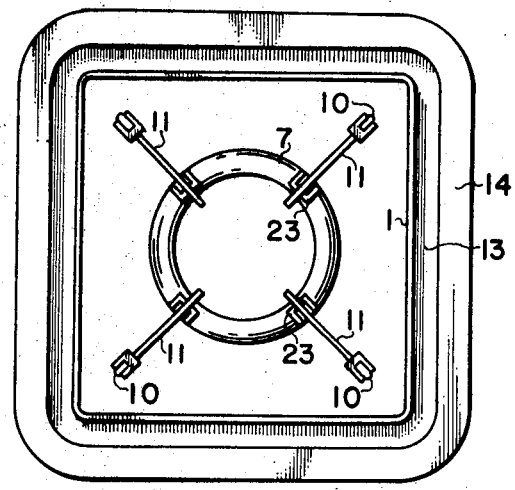
FIG. 3A is a top plan view of the apparatus of FIG. 1 on a slightly enlarged scale, certain details being omitted for the sake of clarity.

Adequate horizontal distribution of the aeration gas at the lowest possible level of the tank 1 is essential for achieving the full benefits of this invention, and a toroidal manifold has been found to provide practically uniform gas distribution over the cross section of tanks which is a regular polygon, such as the square evident from FIG. 3A, a circle, or the like. Downward discharge of air from the nozzles 8 not only lowers the effective bottom level of aeration, but also is more effective in preventing clogging of the nozzle orifices than air discharge from upwardly open nozzles. When the available air pressure is sufficiently higher than the hydrostatic pressure at the tank bottom 5, the bottom serves as a baffle for horizontally distributing the gas.

Figure 3C:
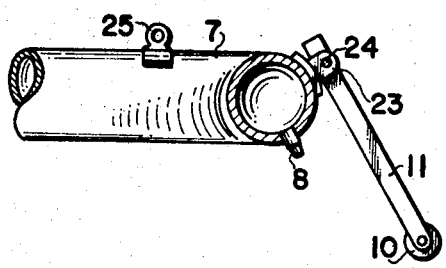
FIG. 3C is a further enlarged view of a portion of the device of FIG. 3B.

When, after extended use or after a shutdown of the unit, the nozzles 8 require cleaning, the entire nozzle assembly 12 is quickly and simply lifted from the tank 1 by means of the cable 9 whose four bottom branches are secured to respective lugs 25 on the manifold 7, cleaned as required, and thereafter returned to its operative position. As is best seen in FIG. 3C, the four legs 11 are attached to the manifold 7 by means of respective forked brackets 23 and pivot pins 24 arranged in such a manner that the legs 11 are pivoted clockwise, as viewed in FIG. 3C, by gravity when lifted from the tank bottom 5, but that swinging movement of the legs 11 on the pins 24 is stopped in the oblique position seen in FIG. 3C by abutting engagement with the brackets 23. If the nozzle assembly 12 should swing horizontally on the cable 9 during vertical movement, only the wheels 10 make contact with the upright walls 2 of the tank 1 and prevent damage to the latter. When the assembly 12 is lowered into the tank, the legs 11 are swung counterclockwise from the position shown in FIG. 3C by the weight of the nozzle assembly when the wheels 10 engage the tank bottom 5, and the assembly is readily centered in the tank in the manner shown in FIG. 3A by repeatedly raising and lowering the cable 9 a short distance.

The wheels 10 cannot simultaneously reach the bottom 5 unless the four legs 11 are diagonally oriented relative to the tank cross section.

Figure 4A:
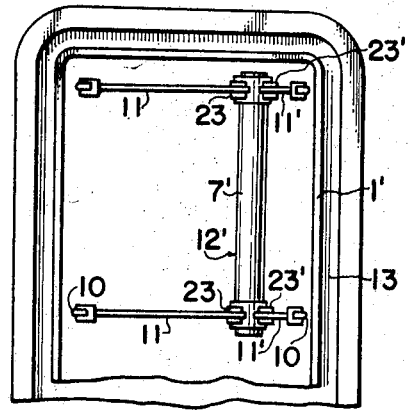
FIG. 4A is a fragmentary top plan view of a modified sludge-activating unit of the invention.
Figure 3B:
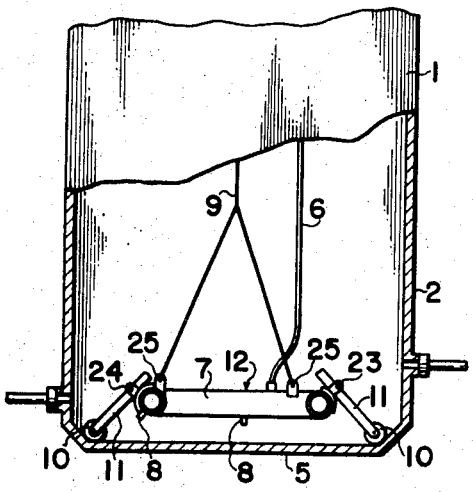
FIG. 3B shows a portion of the apparatus of FIG. 1 on a somewhat larger scale.
Figure 4B:
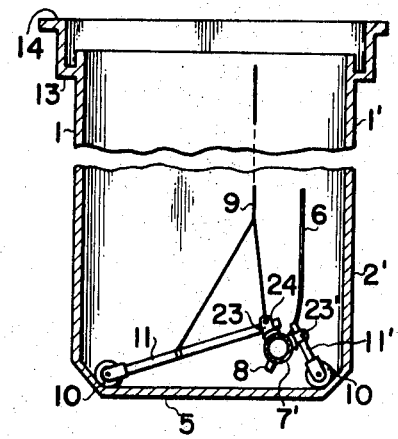
FIG. 4B illustrates the device of FIG. 4A in elevational section.

If an aeration tank 1' of oblong or rectangular cross section is employed, as shown in FIGS. 4A and 4B, a straight manifold 7' is preferred, and the desired wide horizontal distribution of the aerating gas is achieved by directing the nozzles 8 obliquely downward in the direction of smaller tank width. The necessary location of the manifold 7' nearer one of the longitudinal upright walls 2' than the other is ensured by providing the manifold 7' with two longer legs 11 and two shorter legs 11' on differently positioned brackets 23, 23' to achieve automatically the desired orientation of the nozzle assembly 12' when the same is lowered into the tank 1' as described above.

For best utilization of the available compressed air, the effective height of the aeration tank 1' should not be less than four times the greatest internal, horizontal dimension, and is preferably at least six times this dimension, and not less than 6 meters.

Sludge activating units of the type described can be operated with pure oxygen, and the resulting savings in compressor cost and operation, and other advantages, may more than balance the higher cost of the gas. A nozzle assembly closely similar to the aforedescribed assembly 12, but modified for use with pure oxygen, is illustrated in FIGS. 5A and 5B. Its annular manifold 7 carries a coaxial cover 31 of sheet material provided with large openings 27 to permit vertical fluid flow. A waterproof electric motor 29 is mounted centrally in the cover 31 by means of fasteners 30 and drives a propeller 28 under the cover 31 to provide the agitation not otherwise available in the absence of nitrogen. A cable 24 supplies the motor 29 with current through the open top of the tank 1, not itself seen in FIGS. 5A and 5B.

The torque exerted by the rotating propeller 28 on the manifold 7 is normally absorbed by the legs 11 and may be absorbed in part in a relatively rigid suspension arrangement as shown in FIG. 5A, consisting of metal rods 32 connecting the lugs 25 to a ring 33 on a lifting rod 9' which requires a modified winch or other hoisting arrangement, not shown but conventional. Because of the presence of the cover 31, the legs 11 are attached to the manifold 7 by means of modified brackets 11''.

Figure 6:
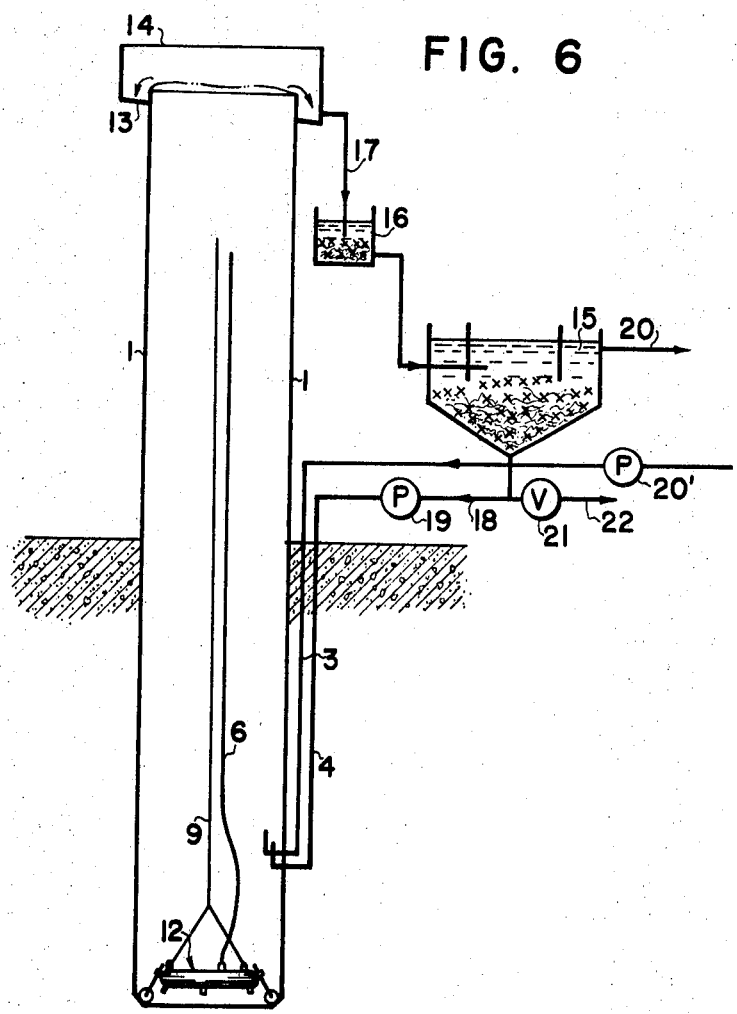
FIG. 6 shows an apparatus substantially identical with that seen in FIG. 1 installed in a different manner.

The tank 1 may be installed entirely below ground level, or partly below ground level, as shown in FIG. 6, while accessory equipment remains above ground. This arrangement reduces the level difference between the overflow trough 14 and the settling tank 15, and permits the connection between the same to be reduced to a single open vessel 16 and associated pipes 17, as shown in the drawing, or an equivalent, nonillustrated array of troughs 17'. Aside from other elements described above with reference to FIG. 1, FIG. 6 shows the slurry pump 20' which forces the waste material into the tank 1 against the hydrostatic pressure prevailing in the tank bottom.

For a given waste-processing capacity, the deep aeration tanks of the invention have been found to be lower in initial cost, and in the cost of operation and maintenance than the relatively shallow tanks employed heretofore. The savings are greatest with tanks whose cross section is a regular polygon such as a square, or a circle. The savings are mainly due to the quicker absorption of oxygen in the portions of the tanks in which the hydrostatic pressure is high, and higher than anywhere in known aeration tanks of sludge-activating units.

When operated with pure oxygen or air enriched with oxygen, the tanks of the invention are used successfully in the conversion of petroleum hydrocarbon waste to soluble products by bacterial fermentation.

We claim:

1. In a waste treatment apparatus having an aeration tank, a settling tank, supply means for supplying a partly liquid and aqueous waste material and an oxygen-bearing gas to said aeration tank for mixing thereof in said tank, a connecting conduit connecting said tanks for transfer of gas-treated waste material from said aeration tank to said settling tank, and recycling means for returning settled solids from said settling tank to said aeration tank, the improvement which comprises:
   a. an overflow on said aeration tank communicating with said connecting conduit for maintaining an upper liquid level in said aeration tank,
      1. said aeration tank having a top open to the atmosphere and an effective height of more than 6 meters between said upper liquid level and a lower supply level at which said gas is normally supplied, said supply means for said gas including
   b. nozzle means for discharging said gas into said partly liquid material;
   c. hoisting means for lowering said nozzle means in said tank to said supply level and for raising said nozzle means from said supply level above said upper liquid level;
   d. said connecting conduit having a plurality of vertically offset sections positioned for sequential flow of said treated waste material through said sections from said overflow to said settling tank, each section being at least partly open to the atmosphere; and
   e. means for changing the direction of said flow between the members of each pair of adjacent offset sections.

2. In an apparatus as set forth in claim 1, each of said sections including an open vessel and a pipe leading into said vessel in a downward direction.

3. In an apparatus as set forth in claim 1, leg means depending from said nozzle means for engaging the bottom of said aeration tank and for thereby supporting the weight of said nozzle means when the nozzle means is on said supply level.

4. In an apparatus as set forth in claim 1, said nozzle means including a manifold and a plurality of nozzles communicating with said manifold and downwardly directed from the same.

5. In an apparatus as set forth in claim 4, a plurality of leg members pivotally attached to said manifold and depending therefrom for engaging the bottom of said aeration tank and for thereby supporting the weight of said nozzle means when the nozzle means is on said supply level, and abutment means on said manifold for limiting pivotal movement of each leg member to a position in which the leg member extends obliquely downwardly from said manifold.

6. In an apparatus as set forth in claim 1, agitator means mounted on said nozzle means for movement therewith by means of said hoisting means, and motor means for operating said agitator means and for thereby agitating said waste material in said aeration tank.

7. In an apparatus as set forth in claim 1, said effective height being at least four times the greatest internal horizontal dimension of said aeration tank as measured within said height.